Feb. 22, 1966  E. W. SPEARS, JR  3,236,048
VAPORIZING MANIFOLD AND FLAMEHOLDER FOR AFTERBURNERS
Filed Sept. 25, 1963  2 Sheets-Sheet 1

INVENTOR.
Esten W. Spears, Jr.
BY
Paul Fitzpatrick
ATTORNEY

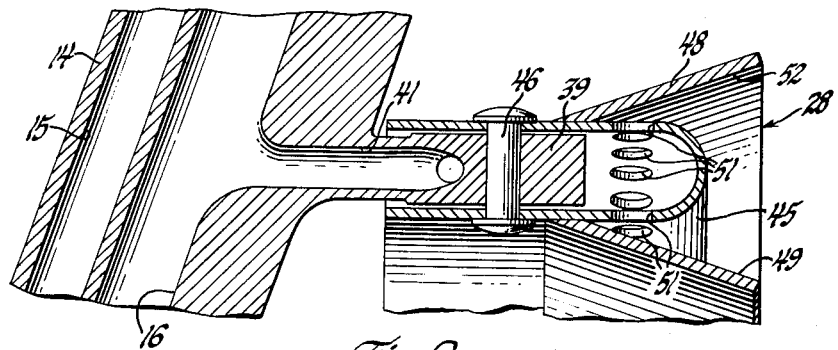
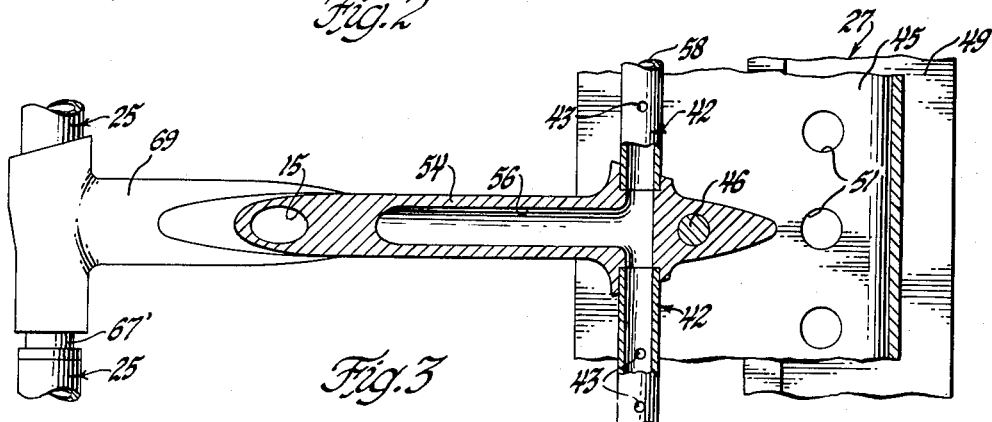
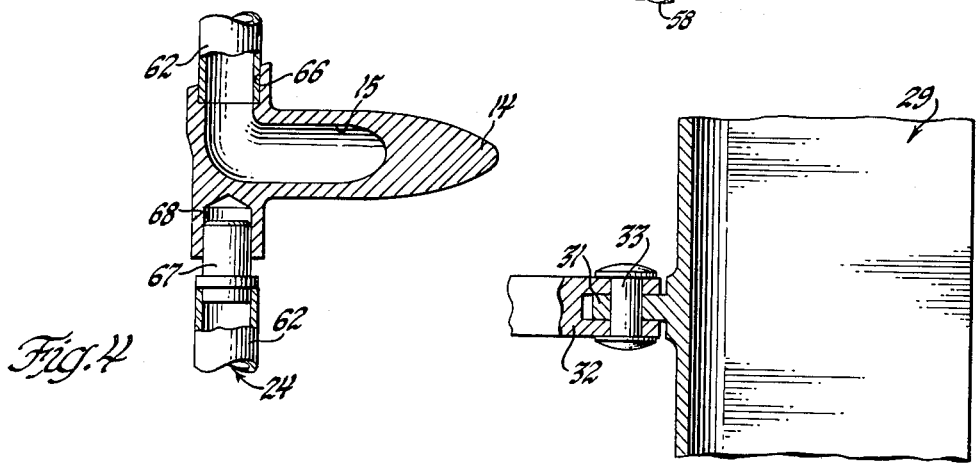
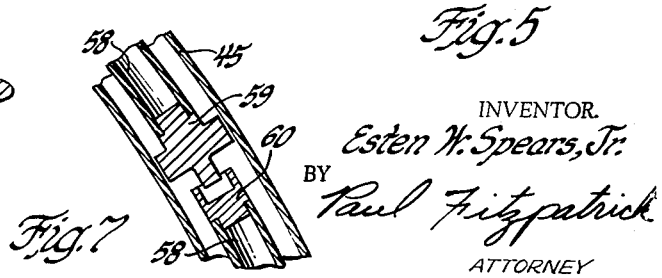
INVENTOR.
Esten W. Spears, Jr.
BY Paul Fitzpatrick
ATTORNEY United States Patent Office
3,236,048
Patented Feb. 22, 1966

3,236,048
VAPORIZING MANIFOLD AND FLAMEHOLDER FOR AFTERBURNERS
Esten W. Spears, Jr., Indianapolis, Ind., assignor to General Motors Corporation, Detroit, Mich., a corporation of Delaware
Filed Sept. 25, 1963, Ser. No. 311,442
1 Claim. (Cl. 60—39.74)

My invention relates to combustion apparatuses for use in large ducts in which the combustion-supporting gas moves at high speed. Such devices include ramjet engines and afterburners for turbojet engines.

The characteristics of my afterburner are such as to make it particularly suitable for use in augmenting the thrust of turbojet engines of the by-pass type. The afterburner of this invention may be preferably employed with a by-pass engine and mixing structure such as that described in my copending application Serial No. 307,904 for Gas Turbine Engine, filed September 10, 1963.

The afterburner according to my invention is particularly adapted to a very wide range of thrust augmentation from about 2% or 3% of the unaugmented engine thrust to about 65%. It achieves this result by a novel combination of vaporizing fuel burners, fill fuel manifolds for injection of additional fuel, and conventional combustion apparatus for full augmentation. It is characterized by a structure providing a high degree of resistance to the high temperatures and buffeting encountered in such burners.

The nature of the invention and the advantages thereof will be clear to those skilled in the art from the succeeding detailed description of the preferred embodiment of the invention and the accompanying drawings thereof.

FIGURE 2 is an enlarged fragmentary view of a portion of FIGURE 1 illustrating a vaporizing fuel manifold and flame-holder.

FIGURE 3 is a framentary sectional view taken on the plane indicated by the line 3—3 in FIGURE 1.

FIGURE 4 is a framentary sectional view taken on the plane indicated by the line 4—4 in FIGURE 1.

FIGURE 5 is a fragmentary sectional view taken on the plane indicated by the line 5—5 in FIGURE 1.

FIGURE 6 is a fragmentary sectional view taken on the plane indicated by the line 6—6 in FIGURE 1.

FIGURE 7 is a fragmentary sectional view taken on the plane indicated by the line 7—7 in FIGURE 1.

Figure 1:
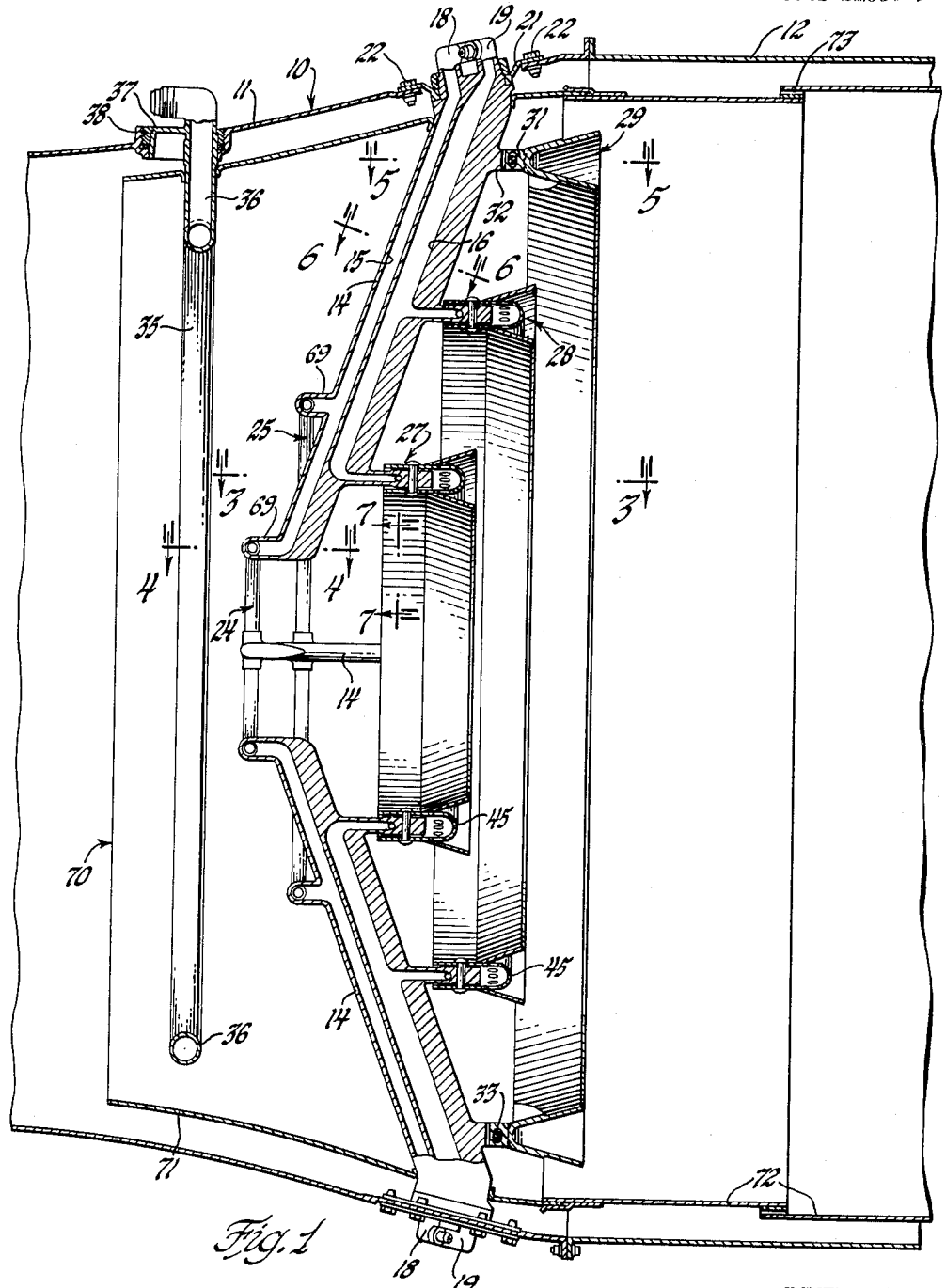
FIGURE 1 is a sectional view of an afterburner taken on a plane containing the axis thereof, illustrating the fuel-injecting and flame-holding apparatus and the forward part of the combustion space.

Referring first to FIGURE 1, the structure comprises an outer case or engine exhaust pipe 10 of circular cross-section made of heat-resistant metal. The case 10 comprises a forward section 11 diverging in the direction of flow and a downstream section 12 defining the combustion zone. The afterburner structure shown is connected to a jet engine of suitable type so that the turbine exhaust gases and the air by-pass flow, if any, are mixed and supplied through the exhaust pipe section 11 into the afterburner. At the downstream end of the combustion apparatus, a variable jet nozzle (not illustrated) is mounted on the section 12. Since the engine and the variable jet nozzle may be of known types, and my invention lies in the arrangement of the afterburner, only the afterburner structure is depicted. The fuel distributing manifolds, vaporizing structure, and flame-holders of the afterburner are all mounted in the section 11 of the casing. The structure comprises four struts 14 equally spaced around the axis. Each strut is streamlined and defines two fuel passages 15 and 16. These are separately and controllably supplied from a suitable source through pipe fittings or connections 18 and 19 at the outer end of each strut. Each strut 14 is fixed to a flange 21, by which it is fixed by a ring of bolts 22 to the casing 11.

The four struts 14 mount an inner fill fuel manifold 24 and an outer fill fuel manifold 25, an inner vaporizing manifold and flame-holder 27, an outer vaporizing fuel manifold and flame-holder 28, and an outermost flame-holder 29. The outermost flame-holder 29 comprises a ring of V-shaped cross-section (see also FIGURE 5) which has a lug 31 extending from it into a clevis in a boss 32 extending rearwardly from each strut 14. A rivet 33 connects the flame-holder to each strut. The rivet holes through bosses 32 have clearance in the radial direction to allow for relative expansion of the flame-holder and its support. This flame-holder serves to stabilize the flame resulting from injection of fuel through a conventional perforated ring fuel manifold 35 mounted ahead of the struts 14. This manifold is filled through a radial pipe 36 integral with the flange 37, which is retained in a boss in the casing 11 by a spanner nut 38. The ring manifold 35 is supported in part by the fuel supply pipe 36 and by other suitable supports distributed around its axis (not shown). The manifold is perforated in any suitable known fashion to discharge fuel into the gas flowing through the afterburner.

The inner and outer fuel vaporizing and flame-holder structures 27 and 28 are essentially identical except for the greater diameter of the outer structure. The vaporizer flame-holder 28 is illustrated in FIGURE 2, and the vaporizer flame-holder 27 is illustrated in FIGURE 3. Referring first to FIGURE 2, a bracket 39 extends rearwardly from each strut 14. A branch passage 41 from the fuel passage 16 extends into the bracket. A segmented fuel spray manifold tube 42 having discharge orifices 43 distributed around its inner and outer surfaces is mounted in the brackets 39 so as to be supplied through the passage 41. A U-section vaporizer ring 45 is mounted so as to embrace the brackets 39 and is mounted thereon with freedom for some relative radial expansion by rivets 46. The vaporizer ring encloses the manifold 42. The rear part of the vaporizer ring lies between diverging rings 48 and 49 welded to it, which serve as flame-holding gutters. The inner and outer arms of the vaporizer ring 45 are provided with numerous holes 51 through which combustion-supporting air (or combustion products) and fuel, partly or completely vaporized, may flow into the annular space 52 between the flame-holder rings 48 and 49.

As will be apparent, the ring 45 is highly heated during operation of the afterburner. The air flowing at high velocity through the afterburner flows into the forward end of the ring 45, over the manifold 42, and out through the holes 51. The fuel spraying into the air and against the arms of ring 45 is heated and largely or completely vaporized, once the afterburner is in operation. This vaporizing process and the concentration of the fuel into the relatively small proportion of the total afterburner air which enters the ring 45 assures complete and stable combustion of relatively small amounts of fuel. Thus, the vaporizing manifolds make possible thrust augmentation on a small scale, where desired.

Referring now to FIGURE 3, the parts of the vaporizer flame-holder assembly 27 are identified by the same numbers as those employed for assembly 28 in FIGURE 2. This assembly is fixed on a bracket 54 extending from the strut 14 and having within it a passage 56 which is the termination of the passage 16 which also supplies the outer vaporizing manifold. The manifolds 42 are in four sections, each 90° section being made up of tube sections 58 extending 45° from each strut. These tubes have plugs 59 and 60 at their outer ends which are slidable relatively to accommodate expansion of the manifold. This is in accordance with the principle of my Patent No. 2,862,359.

FIGURE 4 illustrates the structure of the inner fill fuel manifold 24. This manifold is likewise in four sections, each of 90° extent and each fed through one of the struts 14. A segmental tube 62 is brazed or welded into a socket 66 at the inner end of strut 14 and extends to the next strut where it terminates in a plugged end piloted in the next strut. The piloted end of the manifold comprises simply a plug 67 brazed into the end of the quadrantal section of the tube 62 and piloted in a bore 68 in the side of the strut. The purpose of this structure is to provide for relative expansion of the parts and minimize stresses.

The manifold 25, as illustrated in FIGURE 3, is the same structure as manifold 24. Each section is fixed to a hollow boss 69 extending forwardly from the strut 14 and has an end plug 67' piloted in the boss 71 of the next adjacent strut.

The afterburner includes a liner or inner wall, generally indicated at 70, comprising a first section 71 mounted within the casing section 11 and a series of rings 72 bounding the combustion space. Some of the air flowing into the afterburner enters the space between the outer casing and the liner and flows through this space, cooling the casing. Air is progressively discharged through slots or louvers 73 for film cooling of the liner. The length of the combustion chamber may be whatever is suitable.

The operation of the afterburner may be apparent from the foregoing, but should be considered briefly. For minimum afterburning, the minimum amount of fuel to support combustion is admitted through the fixtures 19 and passages 16 to the vaporizer-type burners 27 and 28, where it is ignited by any suitable means (not shown). Because of the concentration of the fuel in the relatively small zone of the air, a small amount of fuel can be burned successfully so that a small amount of thrust augmentation is possible. Augmentation may be increased by increasing the rate of supply of fuel to the vaporizer manifolds up to the point where their capacity is reached.

For increased augmentation, fuel is supplied through the four fuel inlets 18 to the fill manifolds 24 and 25. These spray fuel into the air flowing through the inside of flame-holder 27 and between the two flame-holders 27 and 28. This fuel is vaporized in the air, and its combustion is assured by the flame from the vaporizer manifolds which acts as a pilot flame.

For still heavier augmentation, fuel is supplied to the outer ring manifold 35 from which it is sprayed and vaporized. The more or less conventional flame-holder 29 substantially downstream from the manifold 35 serves to stabilize the flame from this manifold.

It will be seen that by judicious combination of manifolds and flame-holders of different types, a very flexible afterburner is provided. It will also be apparent that the structure is both simple and rugged, and has safeguards against destructive stresses arising from relative expansion of the parts.

The detailed description of the preferred embodiment of the invention is not to be considered as limiting the scope of the invention, since many modifications may be made by the exercise of skill in the art.

I claim:

A vaporizing burner for an afterburner or the like comprising, in combination, a duct for fast-moving combustion-supporting gas, supporting conduit means extending into the duct, a vaporizer ring of deep U-shaped cross-section mounted on the conduit means with the open end upstream and with perforations in the sides of the ring adjacent the bend of the U, a fuel manifold ring supplied by and mounted on the supporting conduit means within the vaporizer ring adjacent the upstream end of the vaporizer ring, the fuel manifold ring having apertures for discharge of fuel radially of the duct against the sides of the vaporizer ring, and a flame-holding gutter mounted on the sides of the vaporizer ring upstream of the perforations so that the vaporizer ring closes the forward end of the gutter to flow except through the perforations in the vaporizer ring, and extending downstream of the vaporizer ring to receive the vaporized fuel and gas from the vaporizer ring.

References Cited by the Examiner

UNITED STATES PATENTS

| | | | |
|---|---|---|---|
| 2,701,444 | 2/1955 | Day | 60—39.72 X |
| 2,720,078 | 10/1955 | Day et al. | 60—39.72 X |
| 2,862,359 | 12/1958 | Spears | 60—39.72 |
| 2,920,449 | 1/1960 | Johnson et al. | 60—39.74 |
| 2,979,899 | 4/1961 | Salmon et al. | 60—39.72 |
| 3,151,453 | 10/1964 | Lefebvre et al. | 60—39.72 |

MARK NEWMAN, *Primary Examiner.*

CARLTON R. CROYLE, *Examiner.*